United States Patent Office 2,738,291
Patented Mar. 13, 1956

2,738,291

METHOD OF MAGNESIUM OXYCHLORIDE CEMENT STUCCO APPLICATION

Julian C. Williams, Freeport, Tex., assignor to The Dow Chemical Company, Midland, Mich., a corporation of Delaware No Drawing. Application November 6, 1953, Serial No. 390,745

4 Claims. (Cl. 117—70)

This invention relates to the art of stuccoing masonry.

One of the perennial problems which has been encountered in the application of stucco to masonry walls has been the fact that shadow images of the masonry joints would show through single or even double layers of stucco after the material had set. As a result it has in the past been necessary to apply at least two and usually three coats of stucco to masonry in order to have a satisfactory appearance to the finished wall. This entails extra cost in labor and materials.

It is the object of this invention to provide a method whereby satisfactory coverage of masonry can be obtained using only one coat of stucco. A further object is to substantially reduce the cost of stuccoing masonry. Other objects and advantages will be apparent from the following description.

It was known prior to this invention that organosilicon resins render masonry water repellent. Due to the superior characteristics of this silicone treatment it has become widely used in connection with above grade masonry walls. However, as is well known, organosiloxanes are excellent release agents both for organic and a wide variety of inorganic materials. The release properties of silicones are so good that they have almost completely replaced organic release agents in many molding operations. For this reason it is not surprising that attempts to apply Portland cement stucco over masonry which has been treated with silicones proved to be unsatisfactory due to the poor adhesion of the stucco to the treated wall. It is entirely unexpected, therefore, that the magnesium oxychloride cement employed in this invention will adhere satisfactorily to silicone-treated masonry.

In accordance with this invention, masonry is treated with an organopolysiloxane resin, the organosiloxane is allowed to dry and thereafter magnesium oxychloride cement is applied to the treated masonry. In the organopolysiloxane at least a major portion of the polymer linkages are Si-O-Si linkages and any remaining linkages are of the type Si-Si and/or Si-R'-Si where R' is a divalent hydrocarbon radical. The remaining valences of the silicon atoms in the siloxane are satisfied by monovalent hydrocarbon radicals in amount of on the average from 1 to 1.5 of said radicals per silicon atom.

The above defined organosiloxanes are resins which air dry on the surface of the masonry to form a tackfree permanent coat on the walls of the masonry pores. For the purpose of this invention the siloxane resin can be applied either in the form of a completely hydrolyzed polysiloxane resin or in the form of an organosilicon compound which will form the defined resins "in situ" when applied to the masonry. Thus, one can apply to the masonry hydrolyzable silanes and mixtures thereof of the formula $R_nSiX_{4-n}$ where R and n are as above defined and X is any hydrolyzable group such as alkoxy, acetoxy, aryloxy, halogen, amino and hydrogen. In addition mixtures containing a major portion of the above silanes and a minor portion of silanes of the formula $R_nSi_aX_{(2a+2)-n}$ and/or silanes of the formula $$R_n(Si_aR'_{a-1})X_{(2a+2)-n}$$

in which R, R', n, and X are as above defined and $a$ is an integer of at least 2, can be applied to the masonry.

In lieu of the above unhydrolyzed silanes, partial hydrolyzates of these silanes can also be employed in this invention. These partial hydrolyzates are polymeric materials which contain some residual X radicals bonded to the silicon. In general, the partial hydrolyzates are preferred to the unhydrolyzed silanes since they are less volatile and cure more rapidly after application to the masonry. Both the unhydrolyzed and the partially hydrolyzed silanes will undergo substantially complete hydrolysis, from atmospheric moisture, after application to the masonry surface to give the organopolysiloxane resins.

The organosiloxane can also be applied to the masonry in the form of metal salts. Preferably the salts of alkali metals are employed because these salts are water soluble. The salts are polymeric materials in which the metal atoms are linked to the silicon through oxygen atoms (Si-O-M). For the purpose of this invention there should be from 1 to 2, preferably from 1 to 1.2, metal atoms per silicon atom. In these salts there are on the average from 1 to 1.5 monovalent hydrocarbon radicals per silicon atom and at least a major portion of the polymer linkages are Si-O-Si linkages with any remaining polymer linkages being of the type Si-Si and/or Si-R'-Si linkages. After the salts are applied to the masonry, they react with the carbon dioxide and moisture of the atmosphere to form the siloxane resins "in situ."

For the purpose of this invention the monovalent hydrocarbon radicals (i. e., R) attached to the silicon can be any monovalent hydrocarbon radical such as, for example, alkyl radicals such as methyl, ethyl, octadecyl; alkenyl radicals such as vinyl, allyl and cyclohexenyl and aromatic hydrocarbon radicals such as phenyl, tolyl and xenyl. Preferably the hydrocarbon radicals are lower aliphatic hydrocarbon atoms having less than 6 carbon atoms such as methyl, ethyl, vinyl and butyl.

The divalent hydrocarbon radicals, (i. e., R') linking the silicon atoms, which may appear in the organosilicon compounds of this invention can be any divalent hydrocarbon radical such as methylene, ethylene, butylene and phenylene.

Specific examples of the organosilicon compounds which can be employed in this invention are completely hydrolyzed organopolysiloxanes such as copolymers of monomethyl siloxane, monophenyl siloxane, and dimethyl siloxane; copolymers of phenyldimethyl siloxane and $SiO_2$; copolymers of phenylmethylsiloxane, monomethyl siloxane and monophenylsiloxane; copolymers of monomethylsiloxane, monobutylsiloxane and phenylmethylsiloxane and copolymers of monomethylsiloxane and methylvinyl siloxane; hydrolyzable silanes such as methyltriethoxysilane, butyltributoxysilane, methyl-tris(beta-ethoxyethyl) silane, $MeSi(OC_2H_4OC_2H_4OC_2H_5)_3$ methyltriphenoxysilane, propyltricresoxysilane, vinyltriacetoxysilane, phenyltriacetoxysilane, butyltrichlorosilane, methyldiethoxysilane; and alkali metal salts of siloxanes such as the sodium salt of monomethylsiloxane, the potassium salt of monobutylsiloxane and the sodium salt of a mixture of 75 mol per cent monomethylsiloxane and 25 mol per cent dimethylsiloxane in which salt there is an average of 1.1 sodium atoms per silicon atom.

All of the organosilicon compounds employed in this invention are commercially available including those which contain a mixture of Si-O-Si, Si-Si, and Si-R'-Si linkages. These latter materials are obtained by hydrolyzing or partially hydrolyzing a residue obtained from the reaction of alkyl chlorides with silicon and of aromatic hydrocarbons with hydrogen-containing silanes. These residues are more fully described in the copending applications of Arthur J. Barry et al., Serial No. 338,123, filed February 20, 1953, and John W. Gilkey, Serial No. 357,921, filed May 27, 1953. The alkali metal salts of these residues may be prepared by reacting the completely hydrolyzed residues with alkali metal hydroxides.

The organosilicon resins are best applied to the masonry in the form of dilute solutions containing 10% by weight or less, preferably 2 to 5% by weight, of the organosilicon material. Suitable solvents include xylene, toluene, and petroleum naphtha. The alkali metal salts are applied in the form of aqueous solutions.

The cement which is applicable for the method of this invention is composed primarily of a mixture of magnesium oxide and magnesium chloride. In general, the proportions of the two materials relative to each other range from a weight ratio of one part magnesium oxide to four parts magnesium chloride to three parts magnesium oxide to two parts magnesium chloride. As normally applied to masonry, the mixture of magnesium oxide and magnesium chloride is mixed with fillers such as sand, silica, sawdust and the like, and with any desired pigments and with sufficient water to give a composition of the desired consistency.

Before applying the organosilicon compound, the masonry surface should be thoroughly cleaned of all foreign matter such as dirt, loose mortar, and the like. The organosilicon compound is then applied to the masonry in any convenient manner such as by flooding, brushing or spraying.

After the organosilicon compound has been applied, the masonry is allowed to dry. The time of drying will vary with the temperature and with the degree of substitution of the organosilicon compound. In general, in hot weather 24 hours is sufficient while drying times of 72–96 hours may be required in the winter.

After the organosilicon resin is dry, magnesium oxychloride cement is applied to the masonry in a finished coat of the desired thickness and is floated to a uniform and true surface. Care should be taken to thoroughly scrape and work the cement slurry into the pores of the wall surface. This latter precaution will insure a good bond between the stucco and the masonry.

A single coat of stucco ¼″ thick is sufficient to prevent the shadow of the mortar joins in the masonry from showing through. However, in some cases it may be necessary to apply two coats due, for example, to the fact that the masonry is too porous for the use of only one coat. In this case it is desirable to apply an original scratch coat of stucco to the masonry and then to apply the organosilicon compound and allow the latter to dry and thereafter apply a finished coat of stucco. The scratch coat should be thoroughly roughened before application of the finish coat.

The term "masonry" as applied herein has reference to brick, concrete, cinder block and stone construction.

The following examples are illustrative only of this invention and should not be construed as limiting the scope thereof. The scope is properly delineated in the appended claims.

*Example 1*

The organosilicon resins which were employed in the examples below had the following compositions.

Siloxane A was a mixture of 85% by weight of a fluid alkoxylated polysiloxane (1) and 15% by weight of a nonalkoxylated polysiloxane resin (2).

In siloxane (1) there was an average of about 1.1 total monovalent hydrocarbon radicals per silicon atom (said radicals being methyl, ethyl, propyl and butyl) and 24% by weight silicon bonded methoxy groups. In (1) a major portion of the silicon atoms were linked through Si-O-Si linkages and a minor portion of the silicon atoms were linked through Si-Si and Si-R'-Si linkages in which R' was methylene or ethylene.

Siloxane (2) was a copolymer composed of $SiO_2$ and $Me_3SiO_{.5}$ units in which there was an average of 1.2 methyl groups per silicon atom. In (2) all of the polymer linkages were Si-O-Si linkages.

Siloxane B was a fluid polysiloxane having an average of 1.1 monovalent hydrocarbon radicals per silicon atom (said radicals being methyl, ethyl, propyl, and butyl radicals) and having 24% by weight silicon bonded isopropoxy radicals. In this siloxane a major portion of the silicon atoms were connected through Si-O-Si linkages and a minor portion of the silicon atoms were connected through Si-Si linkages and Si-R'-Si linkages where R' was methylene or ethylene.

Siloxane C was a sodium salt of a polysiloxane in which salt there was an average of 1 sodium atom per silicon atom and an average of about 1.1 monovalent hydrocarbon radicals per silicon atom, said radicals being methyl, ethyl, propyl and butyl radicals. In the salt a major portion of the silicon atoms were connected through Si-O-Si linkages and a minor portion of the silicon atoms were connected through Si-Si linkages and Si-R'-Si linkages in which R' was methylene or ethylene.

The magnesium oxychloride cement employed to stucco the masonry walls as shown below had the following composition in parts by weight:

96.2 parts $MgCl_2.6H_2O$
96.2 parts MgO
9.5 parts asbestos shorts
400 parts sand
148 parts silex
5 parts titanium dioxide
91.3 to 107.9 parts water A 5% by weight solution of siloxane A in xylene was applied in a single flood coat to a concrete block wall. After 72 hours a single coat, of about ¼″ thickness, of the magnesium oxychloride cement supra was applied to the treated wall. After the cement had dried the mortar joints in the wall did not show through the stucco and the general appearance of the finished wall was good.

It required 3 coats of Portland cement stucco on an adjacent portion of the wall which had not been treated with any organosilicon compound, in order to hide the masonry joints and to give a satisfactory finish.

*Example 2*

Equivalent results were obtained when the above magnesium oxychloride cement was applied to a concrete block wall which had been treated with a single flood coat of a 5% xylene solution of siloxane B in the manner of Example 1.

*Example 3*

Equivalent results were obtained when the above magnesium oxychloride cement was applied to a concrete block wall which had been treated with a single flood coat of a 3% aqueous solution of siloxane C in the manner of Example 1.

*Example 4*

Equivalent results are obtained when a 5% xylene solution of an organosiloxane resin having the composition 33 mol per cent dimethylsiloxane, 33 mol per cent monomethyl siloxane and 33 mol per cent monophenyl siloxane is employed in the method of Example 1.

That which is claimed is:

1. The method of applying stucco to masonry which comprises treating the masonry with an organopolysiloxane resin in which at least a major portion of the polymer linkages are Si-O-Si linkages, any remaining polymer linkages being selected from the group consisting of Si-Si and Si-R'-Si linkages where R' is a divalent hydrocarbon radical, the remaining valences of the silicon atoms in said siloxane being satisfied by monovalent hydrocarbon radicals in amount of on the average from 1 to 1.5 of said radicals per Si atom, allowing the siloxane to dry and thereafter applying magnesium oxychloride cement to the treated masonry.

2. The method in accordance with claim 1 wherein the monovalent hydrocarbon radicals of the organosiloxane are selected from the group consisting of alkyl and phenyl radicals.

3. The method of applying stucco to masonry which comprises treating the masonry with a solution having a concentration of less than 10% by weight of an organopolysiloxane resin in which at least a major portion of the polymer linkages are Si-O-Si linkages, any remaining polymer linkages being selected from the group consisting of Si-Si and Si-R'-Si linkages where R' is a divalent hydrocarbon radical, the remaining valences of the silicon atoms being satisfied by monovalent hydrocarbon radicals in amount of on the average from 1 to 1.5 of said radicals per Si atom, allowing the siloxane to dry and thereafter applying magnesium oxychloride cement to the treated masonry.

4. The method in accordance with claim 3 wherein the monovalent hydrocarbon radicals of the organosiloxane are selected from the group consisting of alkyl and phenyl radicals.

References Cited in the file of this patent
UNITED STATES PATENTS

| | | |
|---|---|---|
| 2,422,665 | Frederickson et al. | June 24, 1947 |
| 2,574,168 | Brick | Nov. 6, 1951 |